US012353279B2

(12) United States Patent
Zeng et al.

(10) Patent No.: US 12,353,279 B2
(45) Date of Patent: Jul. 8, 2025

(54) OFFLOADING A VALIDITY CHECK FOR A DATA BLOCK FROM A SERVER TO BE PERFORMED BY A CLIENT NODE

(71) Applicant: International Business Machines Corporation, Armonk, NY (US)

(72) Inventors: Rong Zeng, San Jose, CA (US); Lin Feng Shen, Beijing (CN); Xin Wang, Beijing (CN); Jonathan Terner, Beacon, NY (US); D Scott Guthridge, San Jose, CA (US); John Lewars, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 18/229,515

(22) Filed: Aug. 2, 2023

(65) Prior Publication Data

US 2025/0045152 A1 Feb. 6, 2025

(51) Int. Cl.
*G06F 11/00* (2006.01)
*G06F 11/10* (2006.01)

(52) U.S. Cl.
CPC ...... *G06F 11/1016* (2013.01); *G06F 11/1004* (2013.01); *G06F 11/1076* (2013.01)

(58) Field of Classification Search
CPC ............. G06F 11/1016; G06F 11/1004; G06F 11/1076
USPC ...................................................... 714/1–57
See application file for complete search history.

(56) References Cited

U.S. PATENT DOCUMENTS

| 5,406,484 A | 4/1995 | Wurzenberger |
| 6,480,970 B1 | 11/2002 | DeKoning et al. |
| 6,742,081 B2 * | 5/2004 | Talagala .............. G06F 11/1076 714/6.24 |
| 6,952,797 B1 | 10/2005 | Kahn et al. |
| 7,003,702 B2 | 2/2006 | Budd et al. |
| 7,096,415 B1 | 8/2006 | Bots |
| 9,436,722 B1 | 9/2016 | Bent et al. |
| 9,886,472 B2 | 2/2018 | Furman et al. |

(Continued)

OTHER PUBLICATIONS

IBM, "End-to-end checksum," IBM Elastic Storage Server, Mar. 4, 2021, 1 page, retrieved from https://www.ibm.com/docs/en/ess-p8/5.3.0?topic=features-end-end-checksum.

(Continued)

*Primary Examiner* — Sarai E Butler
(74) *Attorney, Agent, or Firm* — Zilka-Kotab, P.C.

(57) ABSTRACT

A computer-implemented method, according to one embodiment, includes receiving, by a server from a client application, a read request for a data block. The method further includes, reading, by the server, data of the data block and checksums associated with the data block, from a data storage drive, and storing, by the server, the data of the data block and the associated checksums in a buffer. A client node is caused, by the server, to use the associated checksums to perform a validity check for the data of the data block and a transmission from the server to the client node. A computer program product, according to another embodiment, includes a computer readable storage medium having program instructions embodied therewith. The program instructions are readable and/or executable by a server to cause the server to perform the foregoing method.

20 Claims, 13 Drawing Sheets

(56) References Cited

U.S. PATENT DOCUMENTS

| | | | |
|---|---|---|---|
| 10,678,755 B2 | 6/2020 | Davis et al. | |
| 11,119,663 B2 | 9/2021 | Borlick et al. | |
| 11,347,422 B1* | 5/2022 | Li | G06F 3/0619 |
| 2007/0283217 A1* | 12/2007 | Gorfajn | G06F 11/1008 |
| | | | 714/E11.034 |
| 2022/0035698 A1* | 2/2022 | Vankamamidi | G06F 3/0641 |
| 2023/0092076 A1* | 3/2023 | Passmore | G06F 11/26 |
| | | | 714/47.1 |

OTHER PUBLICATIONS

Rogerluethy, "What is T10-PI?" Storage CH Blog, Wordpress, Apr. 5, 2011, 2 pages, retrieved from https://rogerluethy.wordpress.com/2011/04/05/what-is-t10-pi/#:~:text=The%20implementation%20of%20the%20T10,end%2Dto%2Dend%20integrity.

IBM, "Network Shared Disk (NSD)," IBM Linux on IBM Systems, Mar. 1, 2023, 10 pages, retrieved from https://www.ibm.com/docs/en/linux-on-systems?topic=configurations-network-shared-disk-nsd.

\* cited by examiner

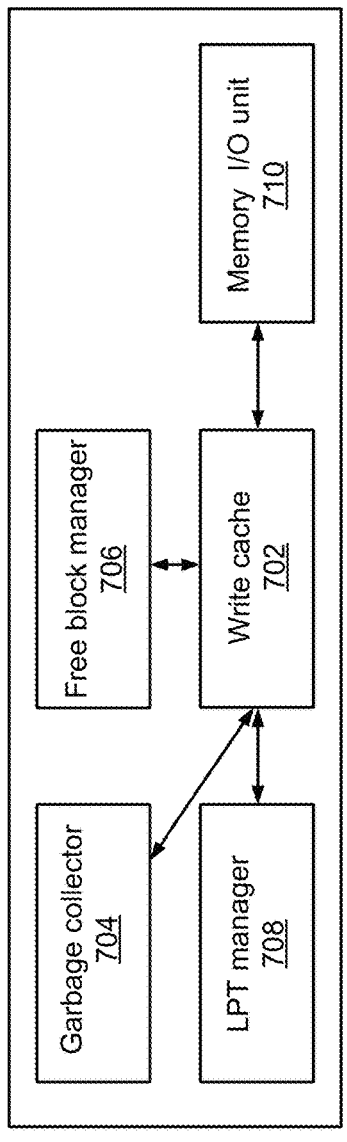
FIG. 7
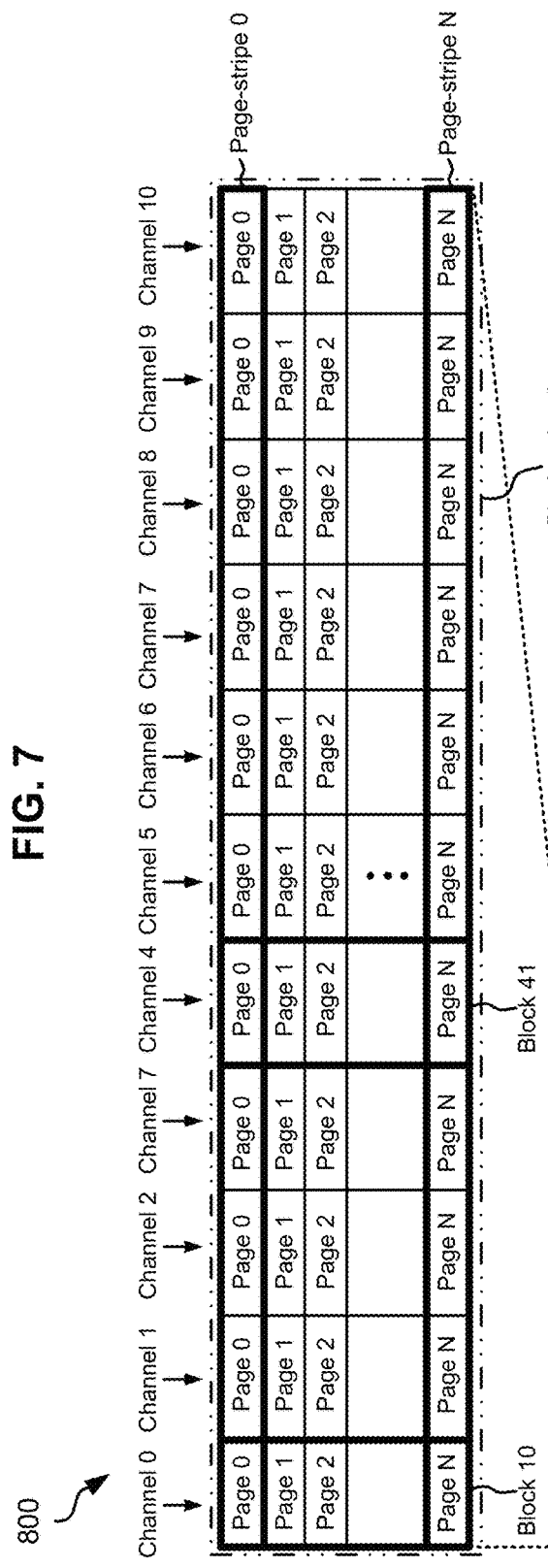
FIG. 8
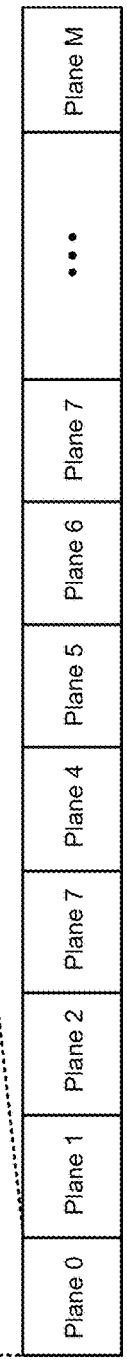

OFFLOADING A VALIDITY CHECK FOR A DATA BLOCK FROM A SERVER TO BE PERFORMED BY A CLIENT NODE

BACKGROUND

The present invention relates to data storage systems, and more particularly, this invention relates to offloading a validity check for a data block from a server to be performed by a client node.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is anywhere from 256, to 512, or even several thousands of pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., Redundant Array of Independent Disk (RAID)-5 and RAID-6 like schemes). The additional redundancy within memory pages may include error correction code (ECC) which, for example, may include BCH, LDPC, or other codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The LSA architecture relies on out-of-place writes. In this approach, a memory page overwrite will result in writing the memory page data to a new location in memory, marking the old copy of the memory page data as invalid, and then updating the mapping information. Due to the limitations of current NAND memory technology, an invalidated data location cannot be reused until the entire block it belongs to has been erased. Before erasing, though, the block undergoes garbage collection, whereby any valid data in the block is relocated to a new block. Garbage collection of a block is typically deferred for as long as possible to maximize the amount of invalidated data in a block, and thus reduce the number of valid pages that are relocated, as relocating data causes additional write operations, and thereby increases write amplification.

End to end integrity is a process of ensuring that data that is read is the same as the data that is recorded in memory. End to end integrity processes are performed in some RAID implementations to detect both media corruption and network and/or transport corruption to ensure data integrity on a filesystem block and data strip level within the block.

SUMMARY

A computer-implemented method, according to one embodiment, includes receiving, by a server from a client application, a read request for a data block. The method further includes, reading, by the server, data of the data block and checksums associated with the data block, from a data storage drive, and storing, by the server, the data of the data block and the associated checksums in a buffer. A client node is caused, by the server, to use the associated checksums to perform a validity check for the data of the data block and a transmission from the server to the client node.

A computer program product, according to another embodiment, includes a computer readable storage medium having program instructions embodied therewith. The program instructions are readable and/or executable by a server to cause the server to perform the foregoing method.

A system, according to another embodiment, includes a plurality of non-volatile random access memory (NVRAM) blocks configured to store data, and a processor and logic integrated with and/or executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7 is a system diagram, in accordance with one embodiment.

FIG. 8 is a conceptual diagram which includes a block-stripe and page-stripe, in accordance with one embodiment.

DETAILED DESCRIPTION

Figure 1:
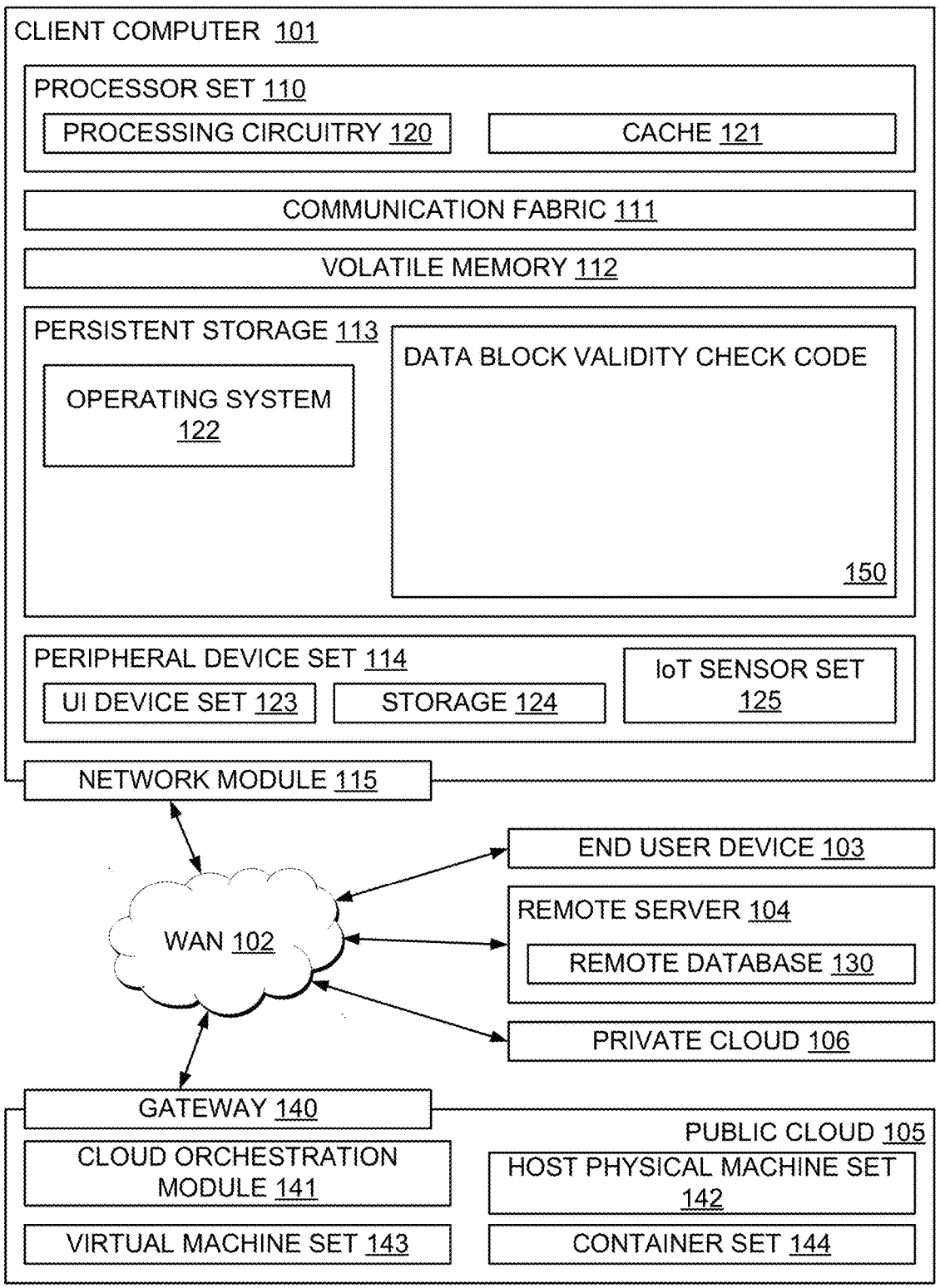
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method includes receiving, by a server from a client application, a read request for a data block. The method further includes, reading, by the server, data of the data block and checksums associated with the data block, from a data storage drive, and storing, by the server, the data of the data block and the associated checksums in a buffer. A client node is caused, by the server, to use the associated checksums to perform a validity check for the data of the data block and a transmission from the server to the client node.

In another general embodiment, a computer program product includes a computer readable storage medium having program instructions embodied therewith. The program instructions are readable and/or executable by a server to cause the server to perform the foregoing method.

In another general embodiment, a system includes a plurality of non-volatile random access memory (NVRAM) blocks configured to store data, and a processor and logic integrated with and/or executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as data block validity check code of block 150 for offloading a validity check for a data block from a server to be performed by a client node. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2:
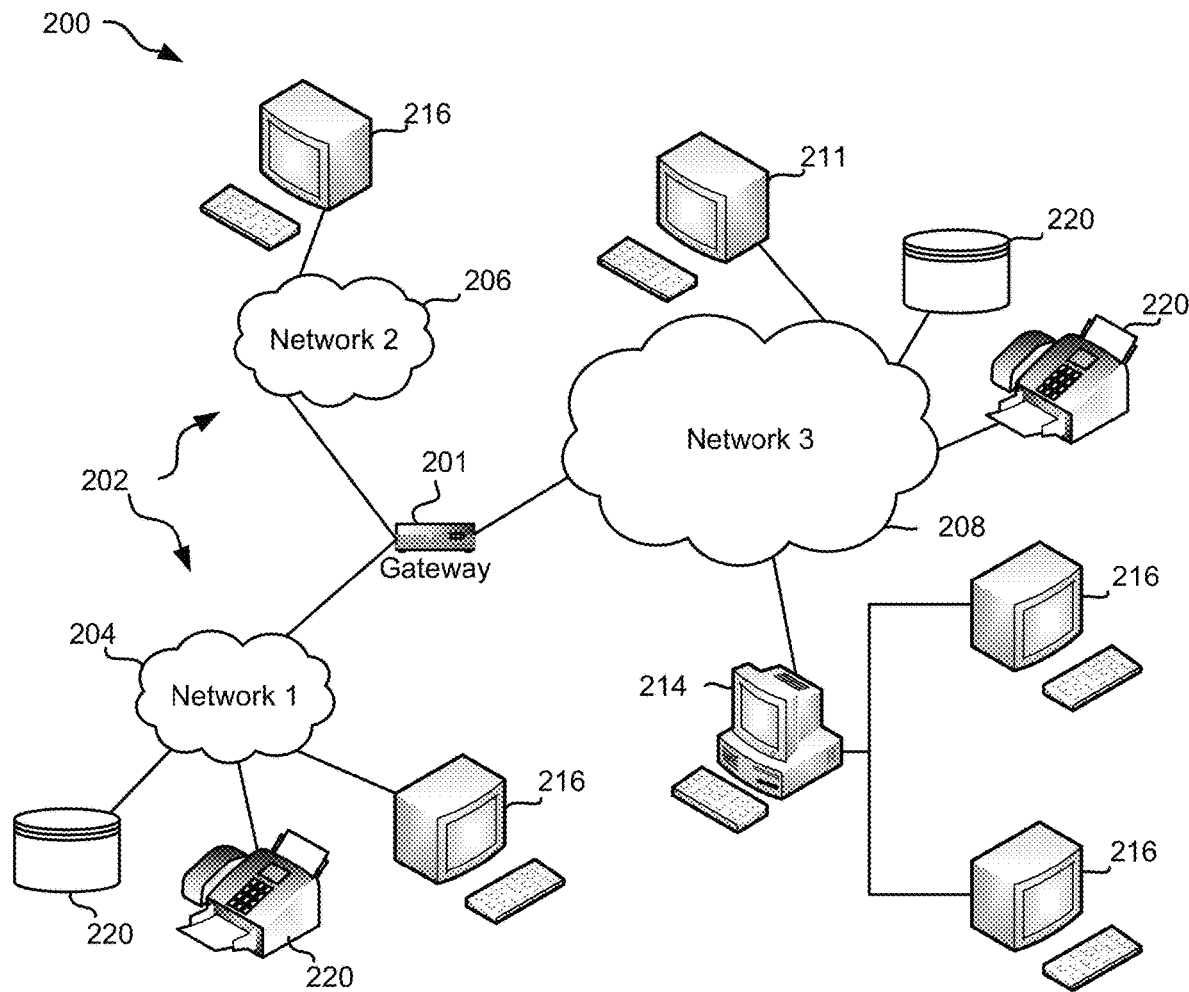
FIG. 2 is a network architecture, in accordance with one embodiment.

FIG. 2 illustrates a network architecture 200, in accordance with one embodiment. As shown in FIG. 2, a plurality of remote networks 202 are provided including a first remote network 204 and a second remote network 206. A gateway 201 may be coupled between the remote networks 202 and a proximate network 208. In the context of the present network architecture 200, the networks 204, 206 may each take any form including, but not limited to a LAN, a WAN such as the Internet, public switched telephone network (PSTN), internal telephone network, etc.

In use, the gateway 201 serves as an entrance point from the remote networks 202 to the proximate network 208. As such, the gateway 201 may function as a router, which is capable of directing a given packet of data that arrives at the gateway 201, and a switch, which furnishes the actual path in and out of the gateway 201 for a given packet.

Further included is at least one data server 214 coupled to the proximate network 208, and which is accessible from the remote networks 202 via the gateway 201. It should be noted that the data server(s) 214 may include any type of computing device/groupware. Coupled to each data server 214 is a plurality of user devices 216. Such user devices 216 may include a desktop computer, laptop computer, handheld computer, printer, and/or any other type of logic-containing device. It should be noted that a user device 211 may also be directly coupled to any of the networks, in some embodiments.

A peripheral 220 or series of peripherals 220, e.g., facsimile machines, printers, scanners, hard disk drives, networked and/or local data storage units or systems, etc., may be coupled to one or more of the networks 204, 206, 208. It should be noted that databases and/or additional components may be utilized with, or integrated into, any type of network element coupled to the networks 204, 206, 208. In the context of the present description, a network element may refer to any component of a network.

According to some embodiments, methods and systems described herein may be implemented with and/or on virtual systems and/or systems which emulate one or more other systems, such as a UNIX® system which virtually hosts an operating system environment, etc. This virtualization and/or emulation may be enhanced through the use of VMware® software, in some embodiments.

In other embodiments, one or more networks 204, 206, 208, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 3:
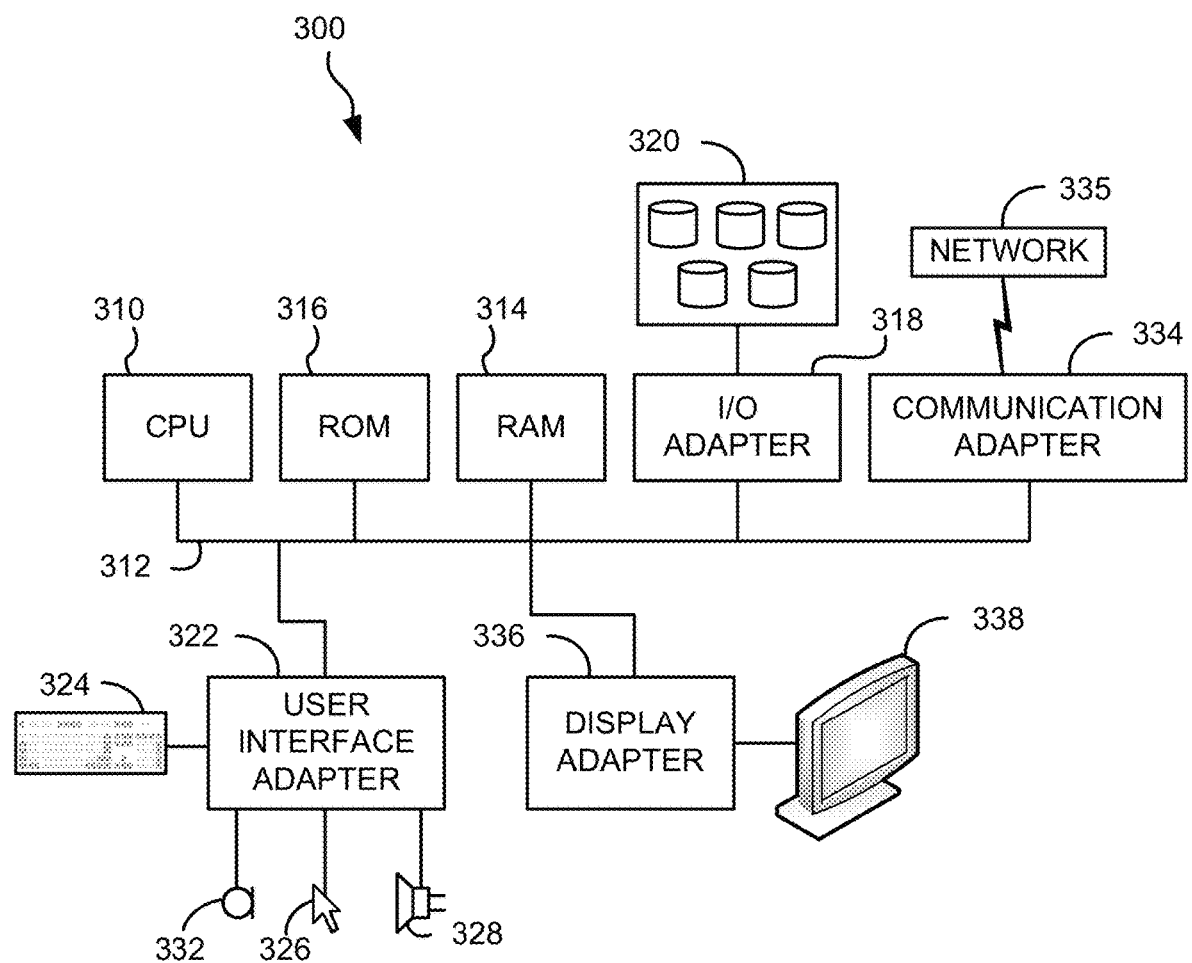
FIG. 3 is a representative hardware environment that may be associated with the servers and/or clients of FIG. 2, in accordance with one embodiment.

FIG. 3 shows a representative hardware environment associated with a user device 216 and/or server 214 of FIG. 2, in accordance with one embodiment. FIG. 3 illustrates a typical hardware configuration of a processor system 300 having a central processing unit 310, such as a microprocessor, and a number of other units interconnected via a system bus 312, according to one embodiment. In some embodiments, central processing unit 310 may include any of the approaches described above with reference to the processor set 110 of FIG. 1.

The processor system 300 shown in FIG. 3 includes a Random Access Memory (RAM) 314, Read Only Memory (ROM) 316, and an I/O adapter 318 of conventional type. Referring still to processor system 300 of FIG. 3, the aforementioned components 314, 316, 318 may be used for connecting peripheral devices such as storage subsystem 320 to the bus 312. In some embodiments, storage subsystem 320 may include a similar and/or the same configuration as data storage system of FIG. 2. According to an example, which is in no way intended to limit the invention, storage subsystem 320 may include non-volatile data storage cards, e.g., having NVRAM memory cards, RAM, ROM, and/or some other known type of non-volatile memory, in addition to RAID controllers as illustrated in FIG. 2.

With continued reference to FIG. 3, a user interface adapter 322 for connecting a keyboard 324, a mouse 326, a speaker 328, a microphone 332, and/or other user interface devices such as a touch screen, a digital camera (not shown), etc., to the bus 312.

Processor system 300 further includes a communication adapter 334 which connects the processor system 300 to a communication network 335 (e.g., a data processing network) and a display adapter 336 which connects the bus 312 to a display device 338.

The processor system 300 may have resident thereon an operating system of any known type. It will be appreciated that a preferred embodiment may also be implemented on platforms and operating systems other than those mentioned. A preferred embodiment may be written using Java®, XML, C, and/or C++ language, or other programming languages, along with an object oriented programming methodology. Object oriented programming (OOP), which has become increasingly used to develop complex applications, may be used.

Figure 4:
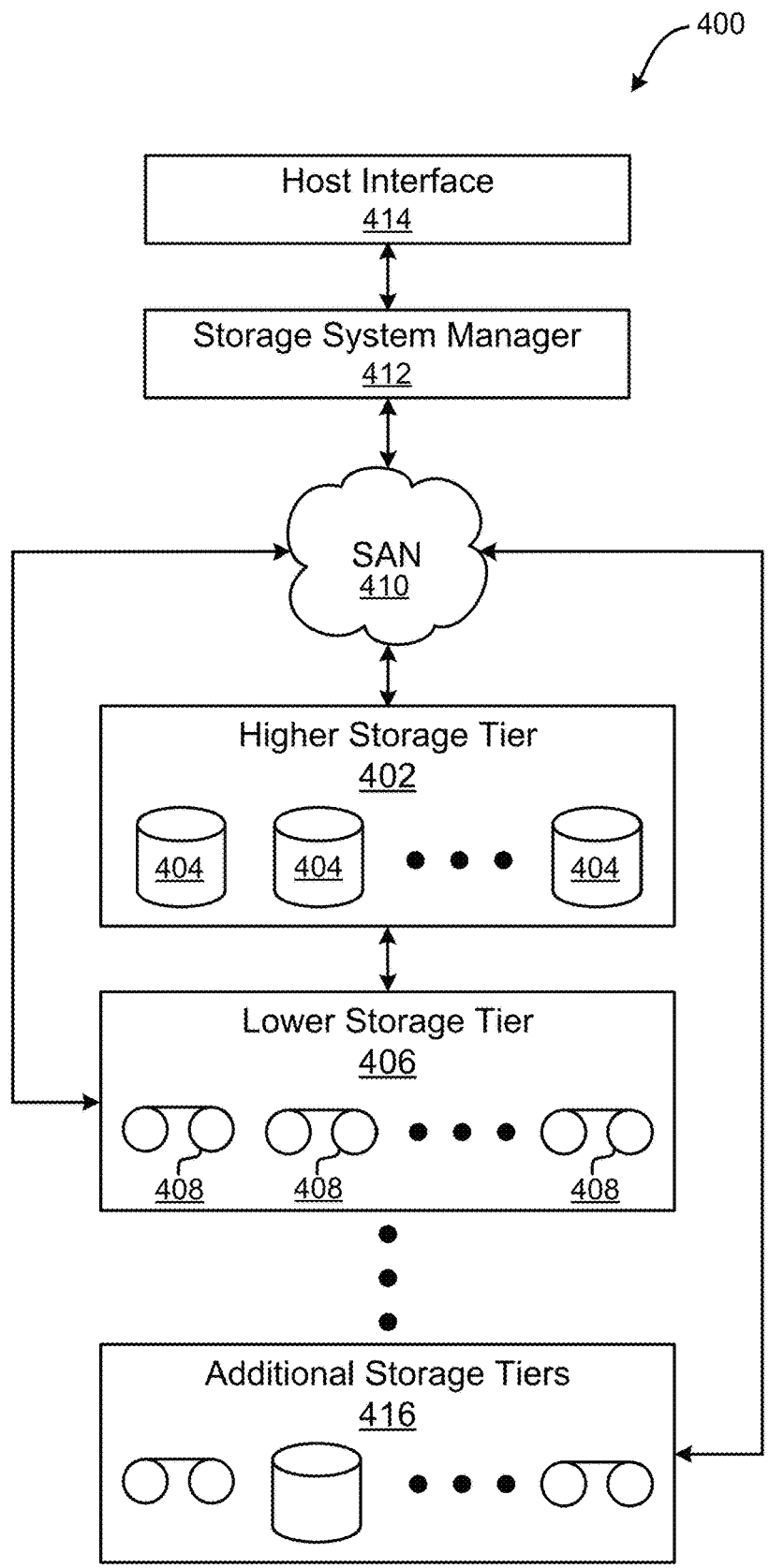
FIG. 4 is a diagram of a tiered data storage system, in accordance with one embodiment of the present invention.

Moreover, FIG. 4 illustrates a storage system 400 which implements high level (e.g., SSD) storage tiers in combination with lower level (e.g., magnetic tape) storage tiers, according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. However, in other approaches, a storage system manager 412 may communicate with a plurality of media on at least one higher storage tier 402, but no lower storage tier. The higher storage tier(s) 402 preferably may include one or more random access and/or direct access media 404, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 402 depending on the desired embodiment.

Referring still to FIG. 4, the lower storage tier(s) 406 preferably includes one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Thus the one or more additional storage tiers 416 may, in some approaches, include a SSD system architecture similar or the same as those illustrated in the FIGS. Described below. Also, any of the higher storage tiers 402 and/or the lower storage tiers 406 may include any combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
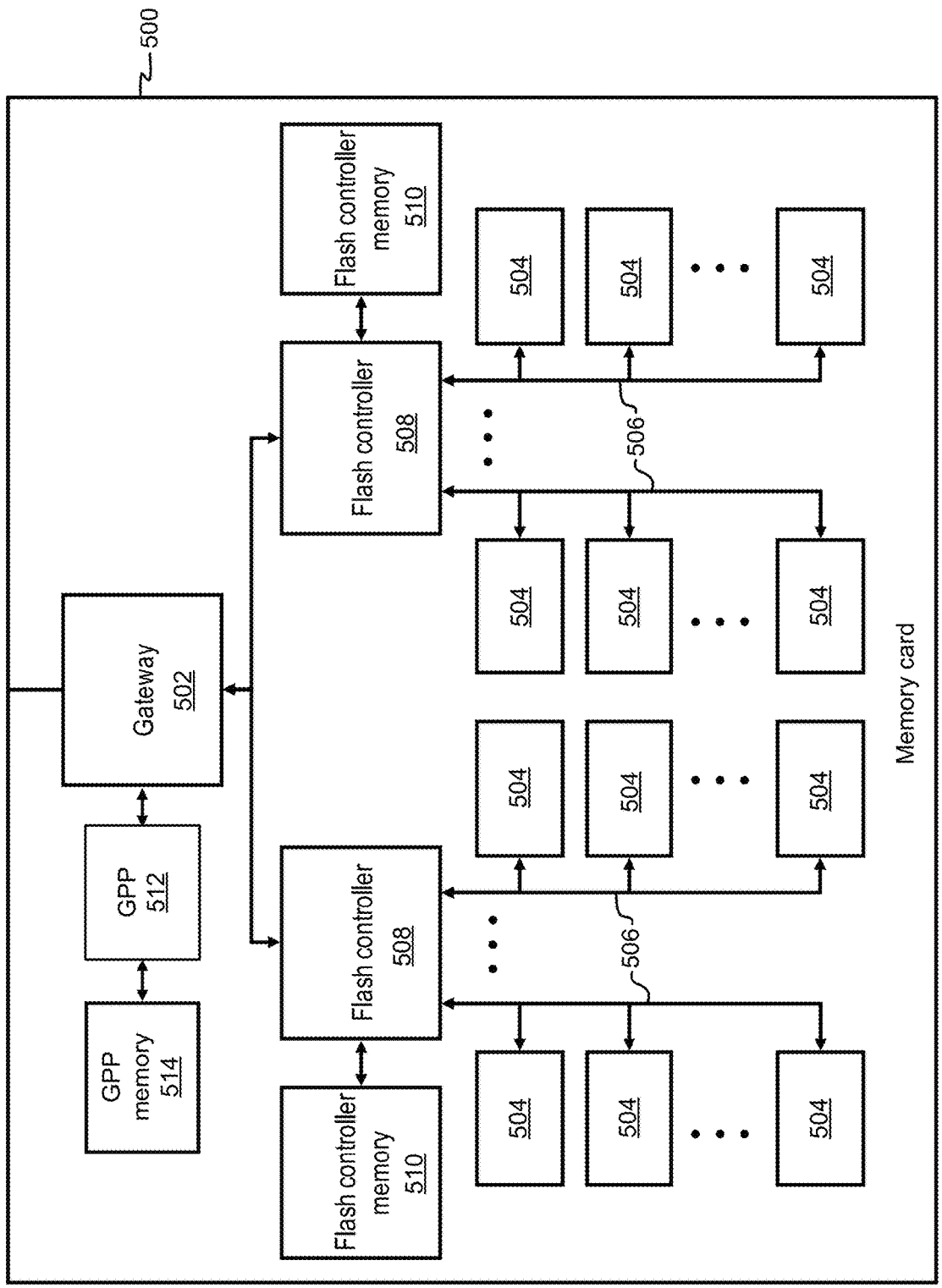
FIG. 5 is a diagram of a non-volatile memory card, in accordance with one embodiment.

FIG. 5 illustrates a memory card 500, in accordance with one embodiment. It should be noted that although memory card 500 is depicted as an exemplary non-volatile data storage card in the present embodiment, various other types of non-volatile data storage cards may be used in a data storage system according to alternate embodiments. It follows that the architecture and/or components of memory card 500 are in no way intended to limit the invention, but rather have been presented as a non-limiting example.

Moreover, as an option, the present memory card 500 may be implemented in conjunction with features from any other embodiment listed herein, such as those described with reference to the other FIGS. However, such memory card 500 and others presented herein may be used in various applications and/or in permutations which may or may not be specifically described in the illustrative embodiments listed herein. Further, the memory card 500 presented herein may be used in any desired environment.

With continued reference to FIG. 5, memory card 500 includes a gateway 502, a general purpose processor (GPP) 512 (such as an ASIC, FPGA, CPU, etc.) connected to a GPP memory 514 (which may comprise RAM, ROM, battery-backed DRAM, phase-change memory PC-RAM, MRAM, STT-MRAM, etc., or a combination thereof), and a number of memory controllers 508, which include Flash controllers in the present example. Each memory controller 508 is connected to a plurality of NVRAM memory modules 504 (which may comprise NAND Flash or other non-volatile memory type(s) such as those listed above) via channels 506.

According to various embodiments, one or more of the controllers 508 may be or include one or more processors, and/or any logic for controlling any subsystem of the memory card 500. For example, the controllers 508 typically control the functions of NVRAM memory modules 504 such as, data writing, data recirculation, data reading, etc. The controllers 508 may operate using logic known in the art, as well as any logic disclosed herein, and thus may be considered as a processor for any of the descriptions of non-volatile memory included herein, in various embodiments.

Moreover, the controller 508 may be configured and/or programmable to perform or control some or all of the methodology presented herein. Thus, the controller 508 may be considered to be configured to perform various operations by way of logic programmed into one or more chips, modules, and/or blocks; software, firmware, and/or other instructions being available to one or more processors; etc., and combinations thereof.

Referring still to FIG. 5, each memory controller 508 is also connected to a controller memory 510 which preferably includes a cache which replicates a non-volatile memory structure according to the various embodiments described herein. However, depending on the desired embodiment, the controller memory 510 may be battery-backed DRAM, phase-change memory PC-RAM, MRAM, STT-MRAM, etc., or a combination thereof.

Figure 6:
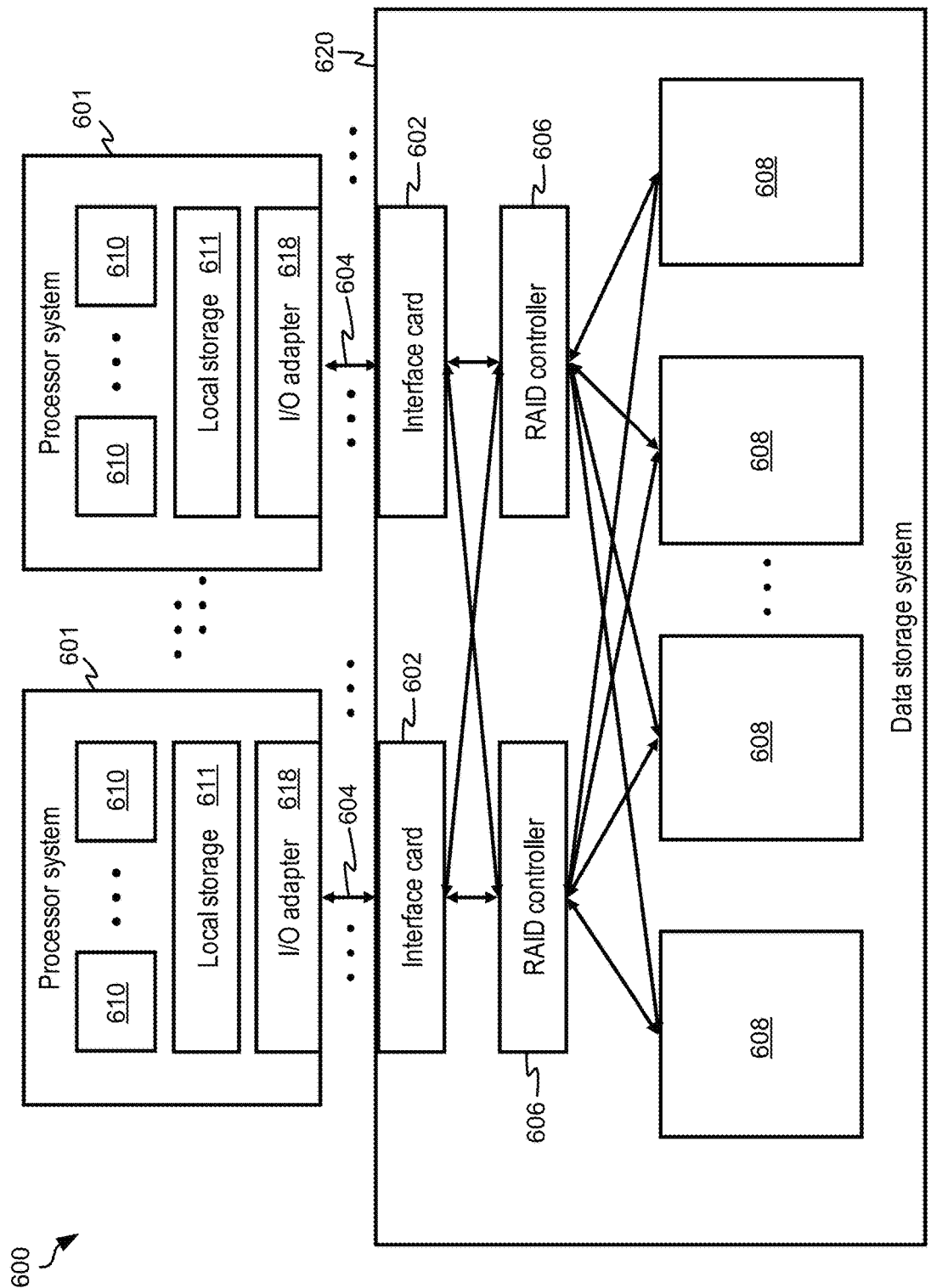
FIG. 6 is a diagram of a data storage system architecture, in accordance with one embodiment.

As previously mentioned, memory card 500 may be implemented in various types of data storage systems, depending on the desired embodiment. FIG. 6 illustrates a data storage system architecture 600 according to an exemplary embodiment which is in no way intended to limit the invention. Moreover, it should be noted that the data storage system 620 of FIG. 6 may include various components found in the embodiment of FIG. 5.

Looking to FIG. 6, the data storage system 620 comprises a number of interface cards 602 configured to communicate via I/O interconnections 604 to one or more processor systems 601. The data storage system 620 may also comprise one or more RAID controllers 606 configured to control data storage in a plurality of non-volatile data storage cards 608. The non-volatile data storage cards 608 may comprise NVRAM, Flash memory cards, RAM, ROM, and/or some other known type of non-volatile memory.

The I/O interconnections 604 may include any known communication protocols, such as Fiber Channel (FC), FC over Ethernet (FCOE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 606 in the data storage system 620 may perform a parity scheme similar to that employed by RAID-5, RAID-10, or some other suitable parity scheme, as would be understood by one of skill in the art upon reading the present descriptions.

Each processor system 601 comprises one or more processors 610 (such as CPUs, microprocessors, etc.), local data storage 611 (e.g., such as RAM 314 of FIG. 3, ROM 316 of FIG. 3, etc.), and an I/O adapter 618 configured to communicate with the data storage system 620.

Referring again to FIG. 5, memory controllers 508, GPP 512, and/or other controllers described herein (e.g., RAID controllers 606 of FIG. 6) may be able to perform various functions on stored data, depending on the desired embodiment. Specifically, memory controllers or GPP 512 may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logic erase blocks (LEBs) may be identified for being reclaimed and/or relocated. Typically, one LEB corresponds to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 508 and/or GPP 512 of FIG. 5) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat segregation.

Heat Segregation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for heat segregation when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, heat segregation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of heat segregation is two-fold. First, performing a garbage collection process on a hot memory block will prevent triggering the relocation of cold data as well. In the absence of heat segregation, updates to hot data, which are performed frequently, also results in the undesirable relocations of all cold data collocated on the same LEB as the hot data being relocated. Therefore the write amplification incurred by performing garbage collection is much lower for embodiments implementing heat segregation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat segregation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Referring now to FIG. 7, a system 700 is illustrated in accordance with one embodiment. As an option, the present system 700 may be implemented in conjunction with features from any other embodiment listed herein, such as those described with reference to the other FIGS. However, such system 700 and others presented herein may be used in various applications and/or in permutations which may or may not be specifically described in the illustrative embodiments listed herein. Further, the system 700 presented herein may be used in any desired environment, e.g., in combination with a controller.

As illustrated, system 700 includes a write cache 702 which is coupled to several other components, including garbage collector 704. As previously mentioned, garbage collector 704 may be used to free LEB units by relocating valid data and providing non-volatile memory blocks to be erased for later reuse. Thus the garbage collector 704 may reclaim blocks of consecutive physical space, depending on the desired embodiment. According to an exemplary embodiment, block erase units may be used to keep track of and/or complete the erase of non-volatile memory blocks handed over by the garbage collector 704.

Write cache 702 is also coupled to free block manager 706 which may keep track of free non-volatile memory blocks after they have been erased. Moreover, as would be appreciated by one of ordinary skill in the art upon reading the present description, the free block manager 706 may build free stripes of non-volatile memory blocks from different lanes (e.g., block-stripes) using the erased free non-volatile memory blocks.

Referring still to FIG. 7, write cache 702 is coupled to LPT manager 708 and memory I/O unit 710. The LPT manager 708 maintains the logical-to-physical mappings of logical addresses to physical pages in memory. According to an example, which is in no way intended to limit the invention, the LPT manager 708 may maintain the logical-to-physical mappings of 4 KiB or 16 KiB logical addresses. The memory I/O unit 710 communicates with the memory chips in order to perform low level operations, e.g., such as reading one or more non-volatile memory pages, writing a non-volatile memory page, erasing a non-volatile memory block, etc.

To better understand the distinction between block-stripes and page-stripes as used herein, FIG. 8 is a conceptual diagram 800, in accordance with one embodiment. LEBs are built from block stripes and typically a single block stripe is used to build a LEB. However, alternative embodiments may use multiple block stripes to form an LEB. As an option, the present conceptual diagram 800 may be implemented in conjunction with features from any other embodiment listed herein, such as those described with reference to the other FIGS. However, such conceptual diagram 800 and others presented herein may be used in various applications and/or in permutations which may or may not be specifically described in the illustrative embodiments listed herein. Further, the controller conceptual diagram 800 presented herein may be used in any desired environment. Thus, the exemplary non-volatile memory controller conceptual diagram 800 of FIG. 8 may be implemented in a cache architecture. However, depending on the desired embodiment, the conceptual diagram 800 of FIG. 8 may be implemented in defining the organization of data stored in non-volatile memory. Accordingly, both implementations are described in turn below.

Non-Volatile Memory

Looking now to FIG. 8, the conceptual diagram 800 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 800 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 800, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 8, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 800, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 8, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripe. Thus, according to an illustrative embodiment, Block 0 through Block 10 from different physical planes may constitute a block-stripe.

Regardless of whether the conceptual diagram 800 of FIG. 8 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or fewer in various embodiments. Analogously, the number of channels per plane and/or the number of planes may vary depending on the desired embodiment.

Referring still to FIG. 8, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As mentioned elsewhere above, end to end integrity is a process of ensuring that data that is read is the same as the data that is recorded in memory. End to end integrity processes are performed in some RAID implementations to detect both media corruption and network and/or transport corruption to ensure data integrity on a filesystem block and data strip level within the block.

In some conventional deployments, the detections for disk media and network corruptions are performed on both the client as well as RAID device server nodes. Separation of the task first ensures integrity when reading filesystem blocks from the de-clustered disks, and then ensures integrity when transferring data to the client nodes. This calls for two cycles of memory fetch. The multiple checksum validations exist because on the server side buffers stay in cache and are used when different operations, such as read operations, are encountered. However, performing these multiple checksum validations is inefficient with respect to memory bandwidth utilization within the stack.

In sharp contrast to the deficiencies described above, the techniques of embodiments and approaches described herein relatively reduce checksum validation operations on a read path down to only a single cycle. This reduction in checksum validation operations relatively reduces memory bandwidth utilization and therefore increases read throughput, without sacrificing the quality of the validation performed. In order to achieve this relative reduction in checksum validation operations, the techniques described herein perform only one checksum validation operation to validate data integration for a read operation. More specifically, instead of having a RAID server performing checksum validation after reading filesystem block from the disks, data and checksum is fetched to client nodes, wherein the client nodes are caused, e.g., instructed, to perform a validation a single time. However, states on the server nodes must be maintained accordingly to ensure buffers within each block will be properly processed for different filesystem operations, e.g., a re-read, writes, erasure code functions, etc., because not having server nodes to validate data integrity and solely relying on client nodes will impact how these buffers could be utilized in various aforementioned operations.

Figure 9A:
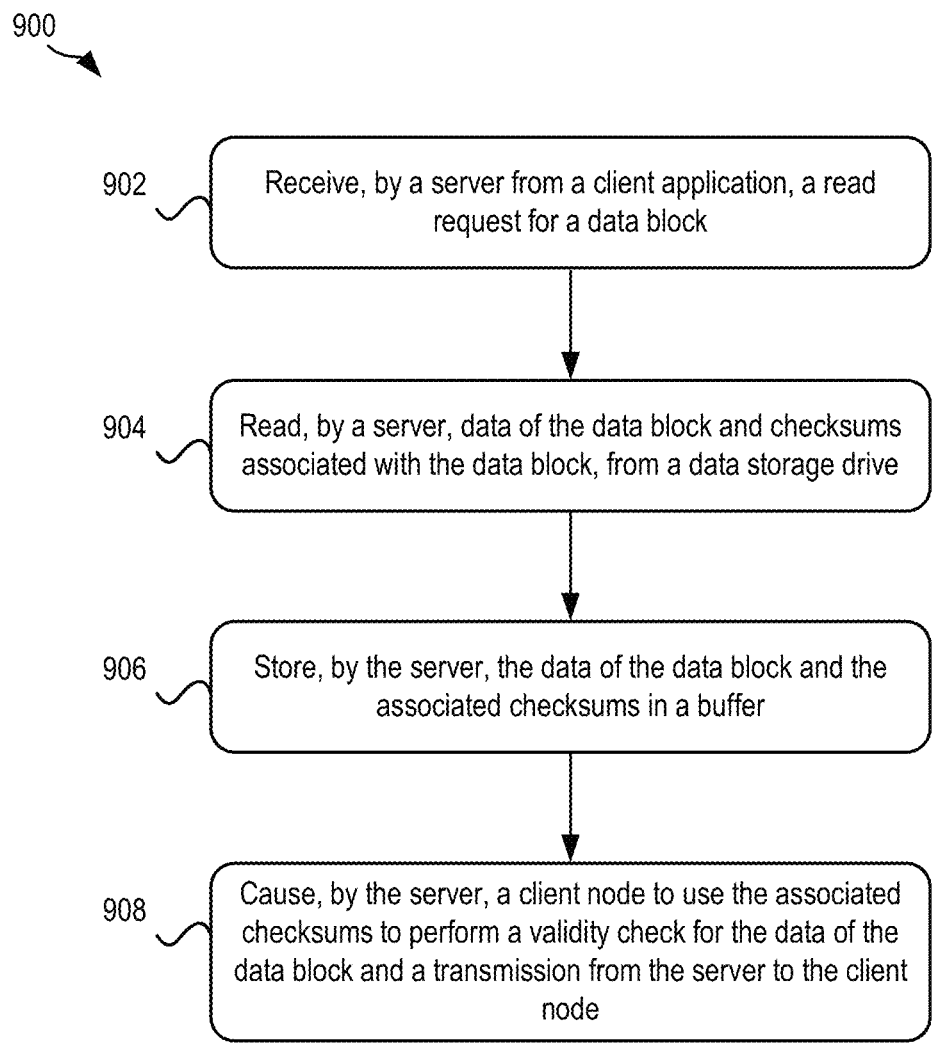
FIG. 9A is a flowchart of a method, in accordance with one embodiment.

Now referring to FIG. 9A, a flowchart of a method 900 is shown according to one embodiment. The method 900 may be performed in accordance with the present invention in any of the environments depicted in FIGS. 1-12, among others, in various embodiments. Of course, more or fewer operations than those specifically described in FIG. 9A may be included in method 900, as would be understood by one of ordinary skill in the art upon reading the present descriptions.

Each of the steps of the method 900 may be performed by any suitable component of the operating environment. For example, in various embodiments, the method 900 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 900 may, in some approaches, be performed by a processing circuit, and more specifically, a processing circuit of a server that has access to at least one data storage drive having data blocks stored thereon. The one or more data storage drives may be, e.g., disk drives having disks, HDD, SSD, NVMe drives, etc. In some preferred approaches, the server is a RAID server of a type that would become apparent to one of ordinary skill in the art after reading the descriptions herein. A client node may be in communication with a network with devices that share access to the data storage drives via the server. For example, in some deployments, the network may be a Network Shared Disk (NSD) network by IBM. Furthermore, in one or more of such deployments, a node of the server, e.g., a server node, may be configured to communicate with and send data to a client node of the network. The client node may be in communication with one or more client applications that send requests for data block(s) to the server, and the client applications may be selectively allowed to process data of the data block(s) associated with a request for the data blocks that is sent from the client application to the server.

As mentioned above, a client application may send a read request for a data block to the server. Accordingly, in some approaches, method 900 includes receiving, by the server from the client application, a read request for a data block, e.g., see operation 902. The data block is located on memory of at least one data storage drive that the server is in communication with.

The read request may be of a type that would become apparent to one of ordinary skill in the art after reading the descriptions herein. For example, in some approaches, the read request is for a full block read of the data block. In some other approaches, the read request is for a partial block read of the data block.

In order to begin a fulfillment of the request, in some approaches, the server obtains data of the requested data block from one or more of the data storage drives by accessing the one or more data storage drives, e.g., by communicating with one or more data storage drives to instruct the data storage drives to read and/or write to memory associated with the data storage drives. Operation 904 includes reading, by the server, data of the data block and checksums associated with the data block, from the data storage drive(s) e.g., via the one or more data storage drives. Method 900 may in some approaches, additionally and/or alternatively include reading checksums associated with the data of the data blocks.

Once accessed, in one or more of such approaches, the server may add the data of the data block to a buffer of the server. For example, method 900, in some approaches, includes storing, by the server, the data of the data block (for the portion of the data block that is read) and the associated checksums in the buffer, e.g., see operation 906. The buffer may be of a type that would become apparent to one of ordinary skill in the art after reading the descriptions herein. In some approaches, the buffer is a general parallel file system (GPFS) Native RAID (GNR) buffer by IBM. In one example, the data server performs a read of at least one of the data storage drives and stores filesystem block data of the data block in a plurality of buffers. In such an example, the data that is read and that is stored to the buffer includes strips of data, e.g., S1, S2, S3 and S4. The buffer includes memory for storing the data, e.g., mem-1×. Furthermore, checksums associated with the portions of data that are read on the data storage drive(s) are stored in one or more buffers as a payload checksum, e.g., CS1, CS2, CS3 and CS4. For example, in some deployments, the buffer is the smallest data unit. Accordingly, in some approaches, the data strip, S1, S2, etc., may each have one or multiple buffers. Each data buffer is followed by a trailer area (on a data storage drive) that includes the data payload checksum and other "predetermined protection information". This predetermined protection information may include protection information associated with a buffer tailer. For context, the predetermined "protection information" is information that may be used to merely verify whether a version of the data that is added to the buffer is actually data that is most recently updated. In some approaches, this predetermined protection information may include metadata that indicates a version of the data that is added to the buffer. Accordingly, the predetermined protection information may be used to ensure that corrupted data does not exist in the buffer, and a most recent version of the data of the data block that was most recently stored in the data storage drive(s) is the version of the data that has been added to the buffer.

In some approaches, additional information associated with the data of the data block may be added to the buffer with the data of the data block and the payload checksum. For example, in some approaches the data of the data block may be protected by parity strip information. For example, the strips of data S1, S2, S3 and S4 may, in one or more of such approaches, be protected by two parity strips, e.g., P1 and P2.

It should be noted that validation of the data block, e.g., a validation of the data of the data block performed using the checksums, is deferred and not performed by the server. Instead, the validation is offloaded to be performed by a client node at a later time (as will be described in greater detail below). In some approaches, a nominal amount of validation operations may or may not be performed by the server upon the data of the data block and the checksums being stored in the buffer(s). However, it should be prefaced that, in such approaches, these validation operations preferably include only verifying other predetermined protection information in a buffer tailer of the data block, e.g., using the predetermined protection information to check whether a most recent version of the data was loaded in the buffer rather than a corrupted version of the data, and do not include a validation of the data of the data block performed using the associated checksums. For example, in continuation of the example above, the server does not verify the data strips S1, S2, S3, and S4 against the checksum, e.g., CS1, CS2, CS3 and CS4. Instead, an assumption is made, e.g., at least temporarily made until the data is thereafter verified by a client node, that a data corruption is not present on the data storage drives that include the data of the data block.

Operation 908 includes causing, by the server, a client node to use the associated checksums to perform a validity check for the data of the data block and a transmission from the server to the client node. In some preferred approaches, the validity check includes a byte per byte check of the data (of the data block) itself using the payload checksum to verify the contents of the buffer. Looking to FIG. 9B, exemplary sub-operations of offloading a validity check from a server to be performed by a client node are illustrated in accordance with one embodiment, one or more of which may be used to perform operation 908 of FIG. 9A. However, it should be noted that the sub-operations of FIG. 9B are illustrated in accordance with one embodiment which is in no way intended to limit the invention.

Figure 9B:
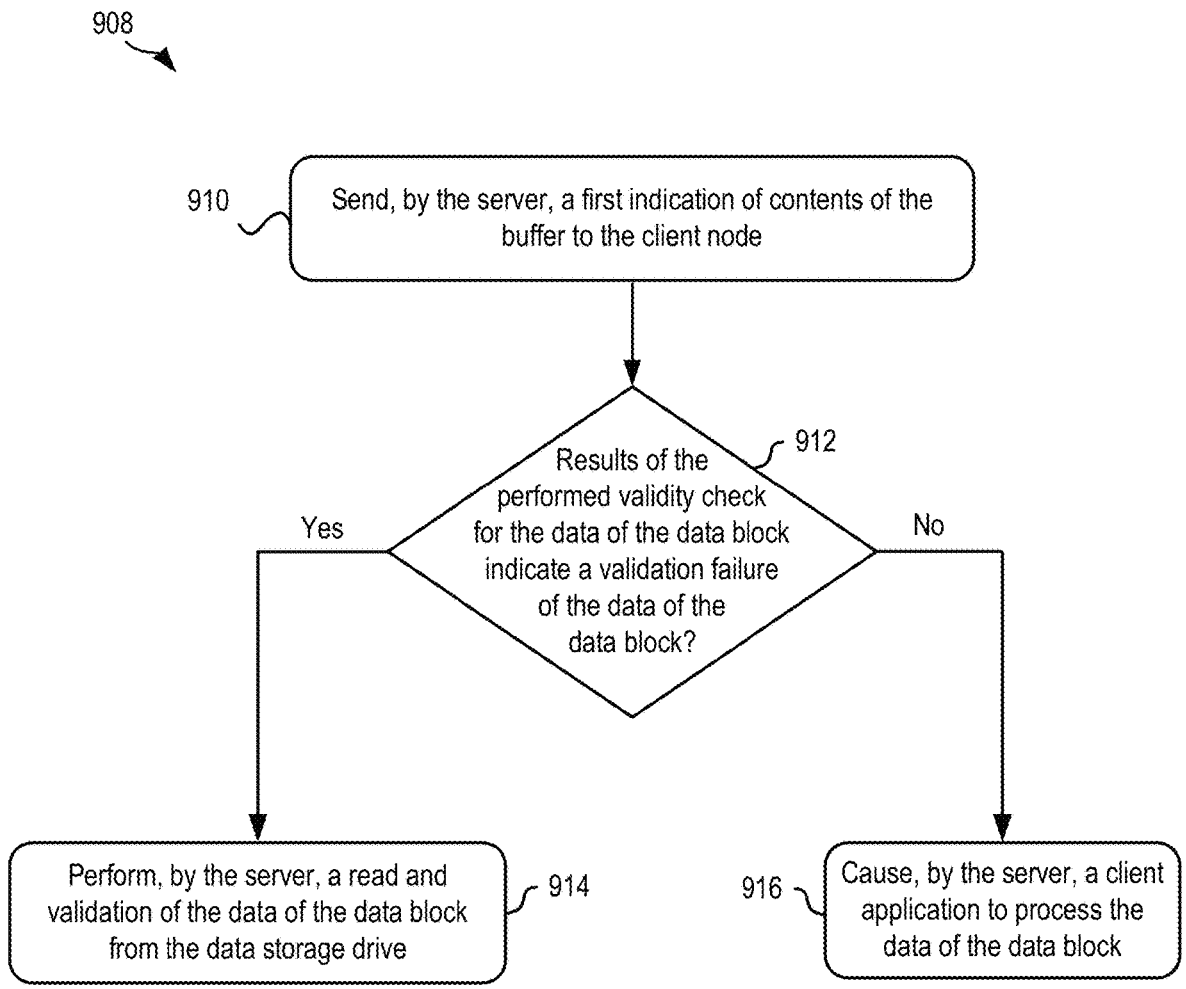
FIG. 9B is a flowchart of sub-operations of an operation of the flowchart of FIG. 9A, in accordance with one embodiment.

Causing the client node to use the associated checksums to perform the validity check for the data of the data block and the transmission from the server to the client node, in some approaches, includes sending, by the server, a first indication of contents of the buffer to the client node, e.g., see sub-operation 910 of FIG. 9B. In one or more of such approaches, the contents of the buffer that are sent to the client node preferably include at least the data of the data block that is read, e.g., strips of data S1, S2, S3 and S4, and the associated checksum, e.g., payload checksum CS1, CS2, CS3 and CS4. The contents may, in some approaches, be sent from the buffer to the client node over the network, e.g., mem-2×, using a known type of transmission protocol that would be apparent to one of ordinary skill in the art after reading the descriptions herein. In some approaches, the contents are sent to and received by a remote direct memory access (RDMA). More specifically, in some approaches, the data strips are sent from a network interface card (NIC) buffer to a buffer of the client node, e.g., mem-3×, and the payload checksum is received by the client node over the network. Data storage drive buffer statement management may additionally and/or alternatively be used to defer the data integrity on server node with other non-read operations. In some approaches, a predetermined erasure code operation maintains consistency within the block.

In order to cause the client node to perform the validity check, in some approaches, the first indication sent to the client node may include an instruction to use the associated checksums to perform the validity check for the data of the data block and the transmission from the server to the client node. The instructions may, in some approaches, additionally and/or alternatively instruct the client device to verify an integrity of the data only one time using the payload checksum without compromising the integrity of the data. In response to receiving such instructions, the client node preferably is caused to verify the data of the data block, e.g., strips of data, e.g., S1, S2, S3 and S4, against the associated checksum, e.g., payload checksum CS1, CS2, CS3 and CS4, a single time, e.g., mem-4×. For context, in some approaches, in order to prevent an integrity of the data from being compromised, method 900 may include causing the filesystem that includes the data of the data block, e.g., a filesystem of the data storage drives, to block data writes until at least a determination is made that the data of the data block that is added to the buffer and sent to the client node is verified. The data is prevented from being compromised as a result of this blocking of write operations. For example, this block prevents instances of corrupted data, which are unknown to be corrupted based on the validation operation not being yet performed, from being incorporated into a data write operation by the server. Accordingly, this blocking of write operations prevents corrupt data, e.g., resulting from corrupted data that is not validated, from being incorporated in the data storage drives, and instead ensures that such data is identified and flagged in the validation operation offloaded to the client node.

Sub-operation 912 includes determining whether results of the validity check performed by the client node for the data of the data block and the transmission from the server to the client node indicate a validation failure of the data of the data block. Note that, depending on the approach, results of the validation check may indicate that the data of the data block are invalid and/or the indication of the buffer contents that was received by the client node are invalid and/or valid. As indicated elsewhere herein, in some preferred approaches, performing the validity check includes a byte per byte check of the data (of the data block) using the payload checksum to verify the contents of the buffer. Accordingly, in some approaches, the determination of whether results of the validity check indicate a validation failure of the data of the data block is based on whether the results indicate, e.g., include a flag and/or notification, that one or more of the byte comparisons identified invalid data. In some other approaches, a determination may be made, e.g., based on a notification received from the client node and/or an application, that the client node is unable to perform the validity check. In response to determining that the client node is unable to perform the validity check, the validation of the data of the data block may be determined to have failed. In response to a determination that results of the validity check indicate a validation failure of the data of the data block, e.g., as illustrated by the "Yes" logical path of sub-operation 912, method 900 preferably includes the server performing one or more backup validation operations. For example, in some approaches, in response to receiving a second indication that results of the performed validity check for the data of the data block and the transmission from the server to the client node indicate a validation failure of the data of the data block, a read and validation of the data of the data block from the data storage drive(s) may be performed by the server, e.g., see sub-operation 914. It should be noted that the "read" performed by the server is a re-read of the data of the block. In other words, in some approaches, the validation that was offloaded from the server to the client node may be performed by the server in response to receiving the second indication. In some approaches, subsequent to the server performing the re-read, the server may perform a validation check of the data of the block (read during the re-read) against associated checksums. Furthermore, in response to a determination that the server validates the data, the data of the data of the block (read during the re-read) and associated checksums may be output from the server to the client node in a second output operation. In some approaches, instructions to perform a validation of the data of the data block (read during the re-read) and associated checksums may be included in the second output operation for causing the client node to perform an additional validation of the data of the data block (read during the re-read).

In some approaches, the second indication is received from the client application, e.g., based on the client application not being provided access to the data by the client node. In some other approaches, the second indication is additionally and/or alternatively received by the server over the network from the client node.

In response to a determination that the validity check performed by the client node for the data of the data block and the transmission from the server to the client node indicate a validation failure of the data of the data block, the data of the data block and the associated checksums may be discarded from the buffer of the server and/or the client node. This discard operation ensures that the data that has not been validated is not incorporated into further read operations and/or incorporated into a write operation which would otherwise create corrupt instances of data.

In response to a determination that results of the validity check indicate a no validation failure of the data of the data block, e.g., as illustrated by the "No" logical path of sub-operation 912, method 900 preferably includes providing a client application access to the data of the data block, e.g., strips of data S1, S2, S3 and S4 are fed to the client application. In some approaches, the client application is additionally and/or alternatively caused to process the data of the data block based on results of the performed validity check for the data of the data block and the transmission from the server to the client node indicating a validation success of the data of the data block, e.g., see sub-operation 916. The server may, in some approaches, cause the server to process the data of the data block based on the server including an instruction in the indication of the contents of the buffer to the client node. It should be noted that a validity check for the data of the data block and the transmission from the server to the client node (other than potentially performing nominal verification operations using predetermined protection information in a buffer tailer of the data block) is not performed by the server in the event that a determination is made that results of the validity check indicate a no validation failure of the data of the data block. Instead, an implicit validation is performed on the server in which the server does not validate the data, assumes that data is valid, and offloads the byte by byte validation of the data of the block to the client node. Thereafter, in some approaches, in response to a determination that the validation fails, explicit validation of the data is optionally performed by the server following a failure mode.

This offloading of the validation operation decreases the overall overhead of the server, creates a single checksum validation for data integrity and thereby increases the I/O response time of the server based on processing resources of the server being preserved. However, despite offloading the validation to the client node, the quality of the validation performed is not sacrificed because a payload checksum for both the data storage drive and network corruption are used, and a checksum match on the client node is available to imply the validation for the server. The processing resources of the server that are preserved as a result of this offloading may, in some approaches, amount to a doubling of memory access on the server, which may cause a doubling of the overall performance of the storage system that includes the data storage drive and the server.

Figure 10:
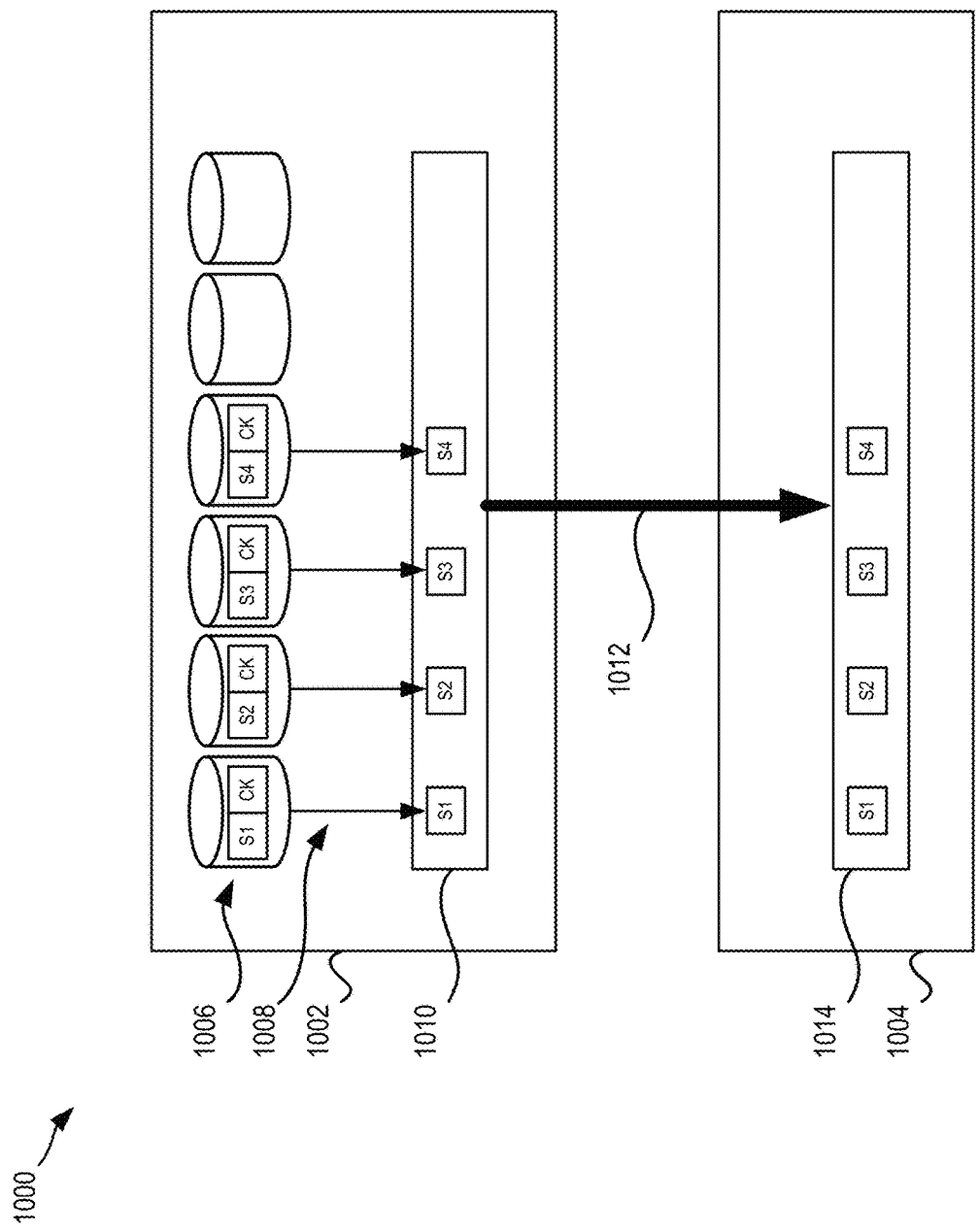
FIG. 10 is an environment, in accordance with one embodiment.

FIG. 10 depicts an environment 1000, in accordance with one embodiment. As an option, the present environment 1000 may be implemented in conjunction with features from any other embodiment listed herein, such as those described with reference to the other FIGS. Of course, however, such environment 1000 and others presented herein may be used in various applications and/or in permutations which may or may not be specifically described in the illustrative embodiments listed herein. Further, the environment 1000 presented herein may be used in any desired environment.

Environment 1000 includes a server node 1002 and a client node 1004. The server node has access to and/or includes a plurality of data storage drives 1006. Read operations 1008 are performed on a data block of the data storage drives in response to receiving, by a processing circuit of the server from a client application, a read request for the data block. Subsequent to performing the read operations 1008, data of the data block, e.g., see data stripes S1, S2, S3 and S4, is added to a buffer 1010 of the server node. It may be noted that, in some approaches, no parity information is stored in the buffer 1010 during an optimized read path. Instead, parity information may be only read during reconstruction or a consistency check and is preferably only validated on the server node.

The data of the data block that is read and added to the buffer 1010 is preferably not validated by the server. Instead, the validation of the data is offloaded to the client node 1004, e.g., see outputting of the buffer contents in operation 1012 which is received by a buffer 1014 of the client node 1004.

Figure 11:
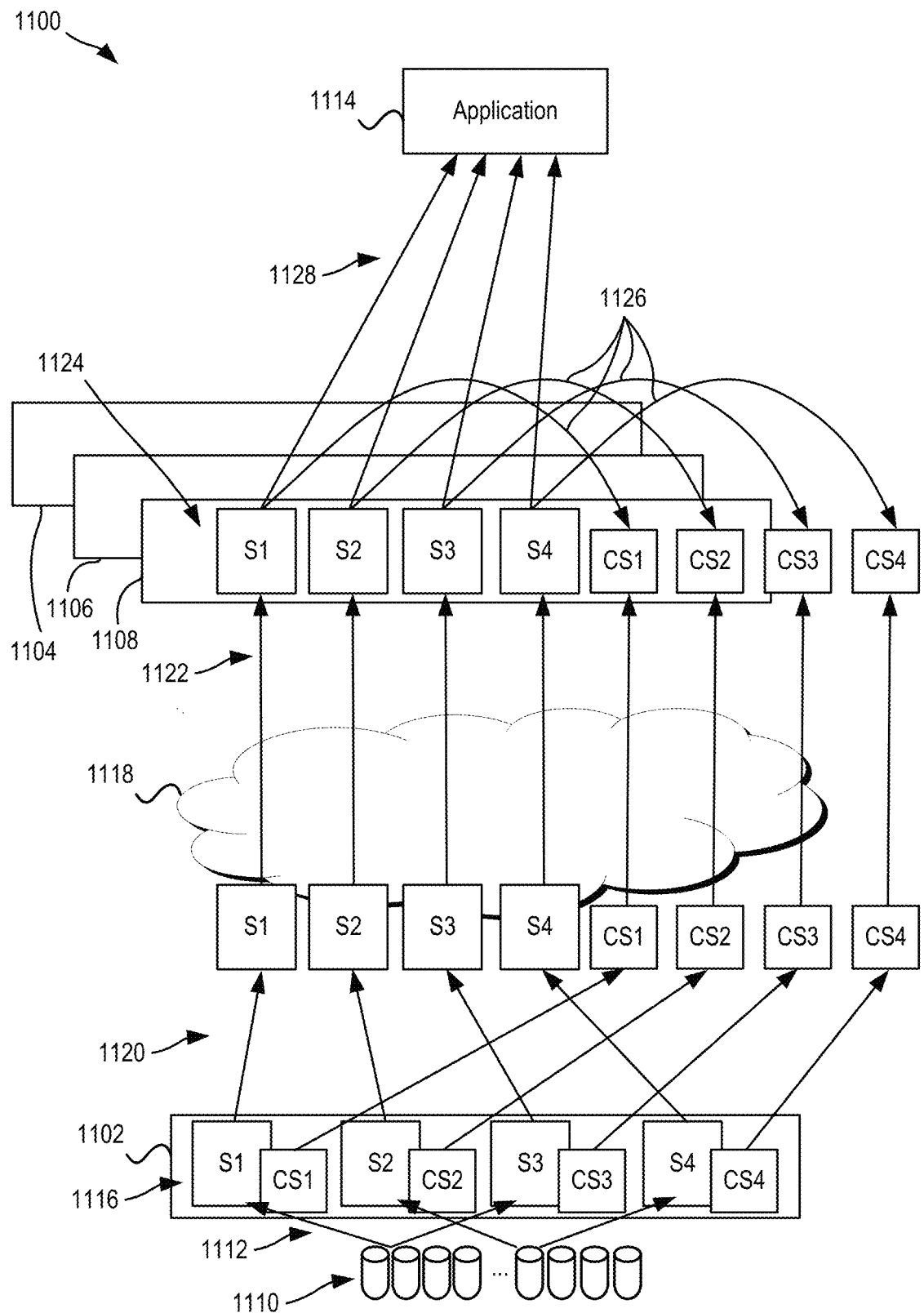
FIG. 11 is an environment, in accordance with one embodiment.

FIG. 11 depicts an environment 1100, in accordance with one embodiment. As an option, the present environment 1100 may be implemented in conjunction with features from any other embodiment listed herein, such as those described with reference to the other FIGS. Of course, however, such environment 1100 and others presented herein may be used in various applications and/or in permutations which may or may not be specifically described in the illustrative embodiments listed herein. Further, the environment 1100 presented herein may be used in any desired environment.

The environment 1100 includes a server node 1102 and a plurality of client nodes 1104, 1106 and 1108 which may be servers. The server node 1102 has access to a plurality of data storage drives 1110. Read operations 1112 are performed on a data block of the data storage drives in response to receiving, by a processing circuit of the server node from a client application 1114, a read request for the data block. Subsequent to performing the read operations 1112, data of the data block, e.g., see data stripes S1, S2, S3 and S4, and checksum information, e.g., see checksum payload that includes CS1, CS2, CS3 and CS4, are added to a buffer 1116 of the server node 1102.

The data in the buffer 1116 read from the data storage drives is not validated by the server node using the checksum information but remains in a "not-validated" state, and the validation is offloaded to the client node. For example, the contents of the buffer may be transmitted through a network 1118, e.g., see transmission operation 1120, to a buffer 1124 of the client node 1108, e.g., see transmission operation 1122. There, data is implicitly validated or invalidated on the client side node. For example, the client node may be caused, e.g., instructed, to use the associated checksums to perform a validity check for the data of the data block and the transmission from the server to the client node, e.g., see check operation 1126. A client application is caused to process the data of the data block in response to a determination that results of the performed validity check for the data of the data block and the transmission from the server to the client node indicate a validation success of the data of the data block, e.g., see data of the data block provided to the client application 1114 in operation 1128.

In contrast, in response to receiving an indication that results of the performed validity check for the data of the data block and the transmission from the server to the client node indicate a validation failure of the data of the data block a read and validation of the data of the data block may be performed, by the server node, from the data storage drive. In other words, a re-read may be performed against the data in a not-validated state. In some approaches, data in a not-validated state is preferably validated explicitly during a partial read or when the data is involved in a write that involves partial filesystem block but multiple full buffers and/or a write operation that involves a full filesystem block (which also means full buffers). In response to a determination that the validation failed, the data is discarded and a re-read from the data storage drive is performed.

Figure 12:
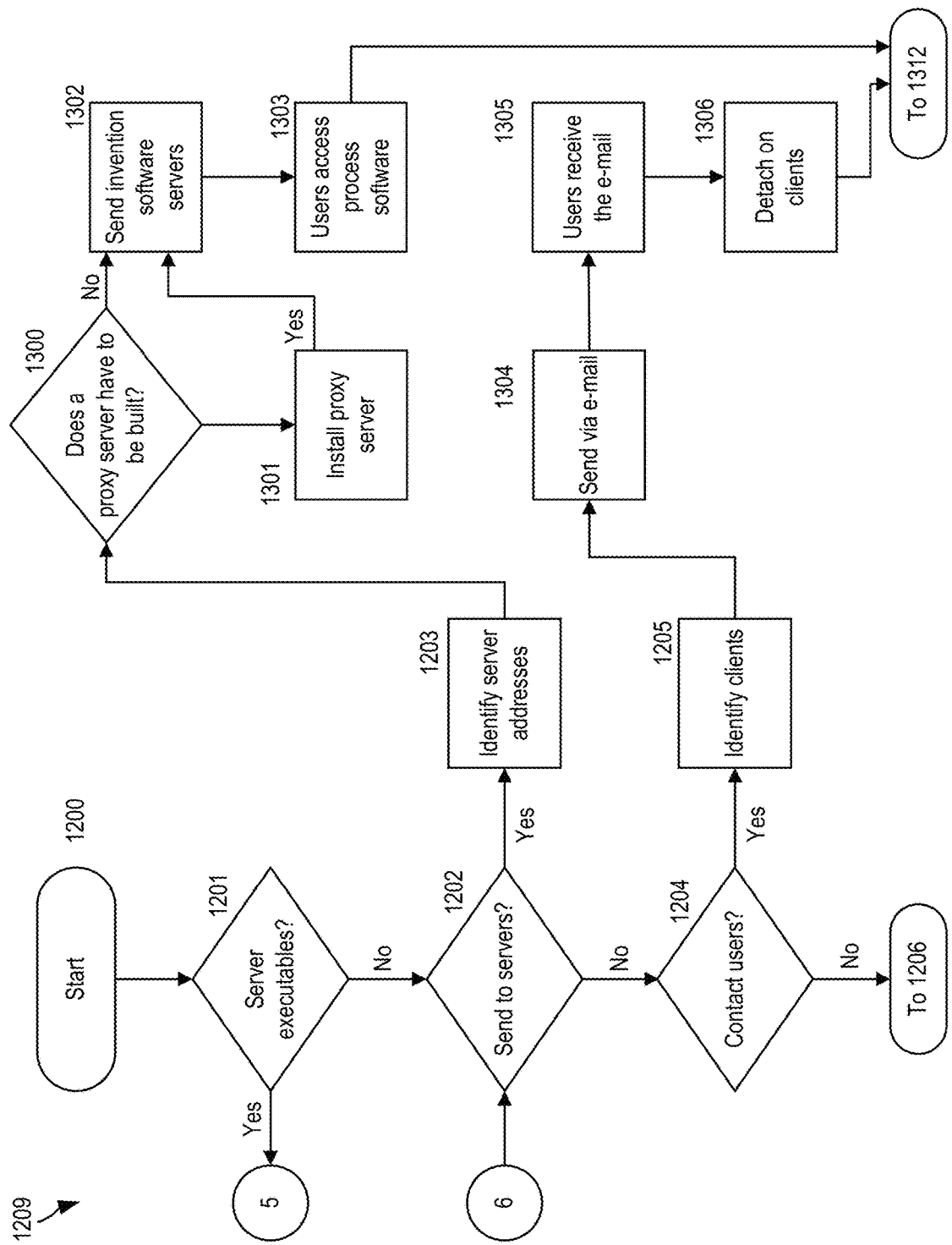
FIG. 12 is a flowchart of a method, in accordance with one embodiment.
Figure 12:
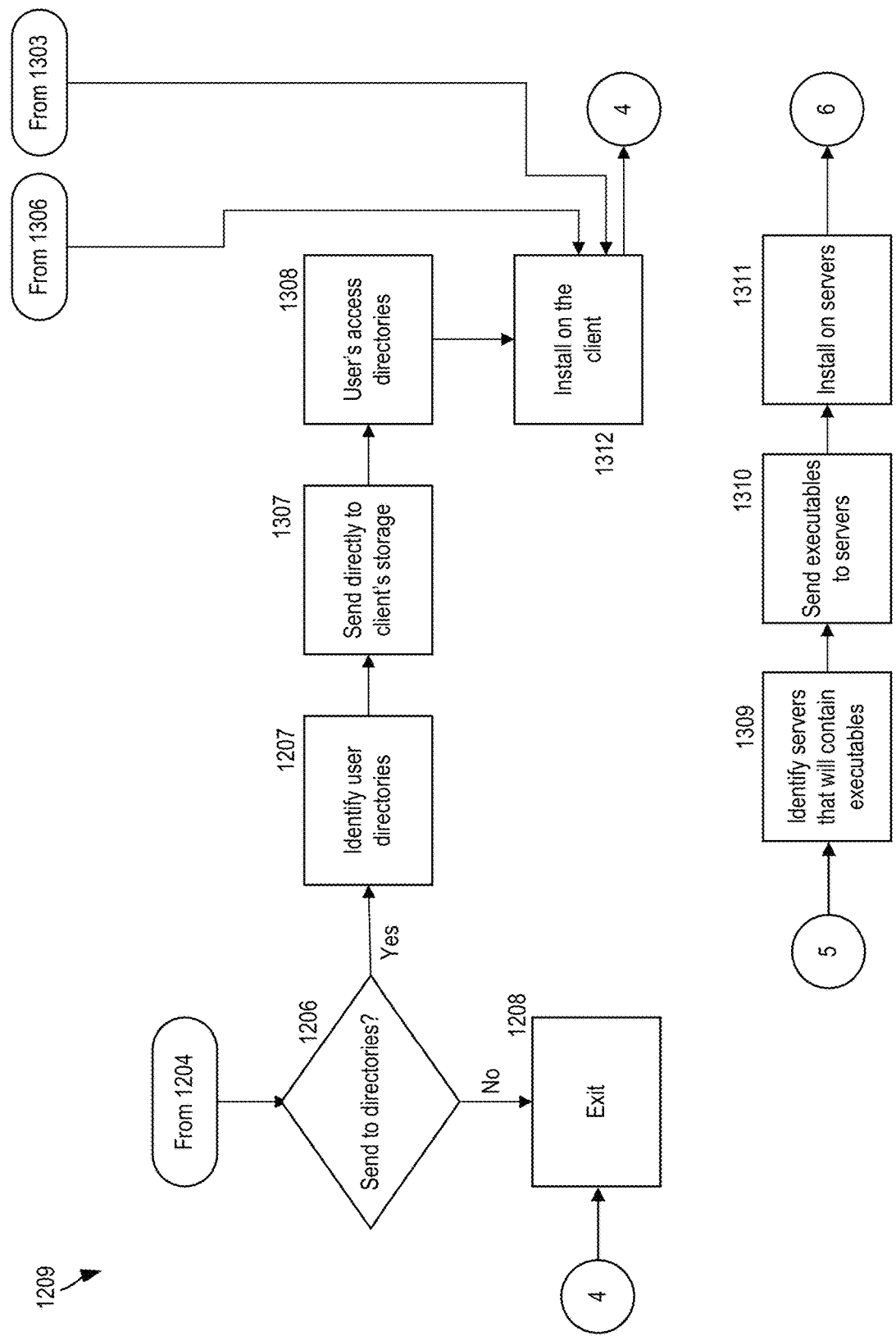

Now referring to FIG. 12, a flowchart of a method 1209 is shown according to one embodiment. The method 1209 may be performed in accordance with the present invention in any of the environments depicted in FIGS. 1-12, among others, in various embodiments. Of course, more or fewer operations than those specifically described in FIG. 12 may be included in method 1209, as would be understood by one of ordinary skill in the art upon reading the present descriptions.

Each of the steps of the method 1209 may be performed by any suitable component of the operating environment. For example, in various embodiments, the method 1209 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 1209. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software for offloading a validity check for a data block from a server to be performed by a client node may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 1200 begins the deployment of the process software. An initial step is to determine if there are any programs that will reside on a server or servers when the process software is executed (1201). If this is the case, then the servers that will contain the executables are identified (1309). The process software for the server or servers is transferred directly to the servers' storage via FTP or some other protocol or by copying though the use of a shared file system (1310). The process software is then installed on the servers (1311).

Next, a determination is made on whether the process software is to be deployed by having users access the process software on a server or servers (1202). If the users are to access the process software on servers, then the server addresses that will store the process software are identified (1203).

A determination is made if a proxy server is to be built (1300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (1301). The process software is sent to the (one or more) servers either via a protocol such as FTP, or it is copied directly from the source files to the server files via file sharing (1302). Another embodiment involves sending a transaction to the (one or more) servers that contained the process software, and having the server process the transaction and then receive and copy the process software to the server's file system. Once the process software is stored at the servers, the users via their client computers then access the process software on the servers and copy to their client computers file systems (1303). Another embodiment is to have the servers automatically copy the process software to each client and then run the installation program for the process software at each client computer. The user executes the program that installs the process software on his client computer (1312) and then exits the process (1208).

In step 1204 a determination is made whether the process software is to be deployed by sending the process software to users via e-mail. The set of users where the process software will be deployed are identified together with the addresses of the user client computers (1205). The process software is sent via e-mail (1304) to each of the users' client computers. The users then receive the e-mail (1305) and then detach the process software from the e-mail to a directory on their client computers (1306). The user executes the program that installs the process software on his client computer (1312) and then exits the process (1208).

Lastly, a determination is made on whether the process software will be sent directly to user directories on their client computers (1206). If so, the user directories are identified (1207). The process software is transferred directly to the user's client computer directory (1307). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (1308). The user executes the program that installs the process software on his client computer (1312) and then exits the process (1208).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a server from a client application, a read request for a data block;
   reading, by the server, data of the data block and checksums associated with the data block, from a data storage drive;
   storing, by the server, the data of the data block and the associated checksums in a buffer; and
   causing, by the server, a client node to use the associated checksums to perform a validity check for the data of the data block and a transmission from the server to the client node.

2. The method of claim 1, wherein causing the client node to use the associated checksums to perform the validity check includes: transmitting, by the server, a first indication of contents of the buffer to the client node, wherein the first indication includes an instruction to use the associated checksums to perform the validity check, wherein the server transmits the first indication across a network between a node of the server and the client node.

3. The method of claim 2, comprising: in response to receiving a second indication that results of the performed validity check indicate a validation failure of the data of the data block, performing, by the server, a read and validation of the data of the data block from the data storage drive.

4. The method of claim 3, wherein the second indication is received from the client application.

5. The method of claim 2, comprising: causing, by the server, the client application to process the data of the data block based on results of the performed validity check indicating a validation success of the data of the data block.

6. The method of claim 5, wherein a validity check is not performed by the server.

7. The method of claim 1, wherein the read request is a full block read of the data block.

8. The method of claim 1, comprising: causing a filesystem of the data storage drive to block data writes at least until a determination is made that the data of the data block is validated during performance of the validity check.

9. A computer program product, the computer program product comprising a computer readable storage medium having program instructions embodied therewith, the program instructions readable and/or executable by a server to cause the server to:
   receive, by the server from a client application, a read request for a data block;
   read, by the server, data of the data block and checksums associated with the data block, from a data storage drive;
   store, by the server, the data of the data block and the associated checksums in a buffer; and
   cause, by the server, a client node to use the associated checksums to perform a validity check for the data of the data block and a transmission from the server to the client node.

10. The computer program product of claim 9, wherein causing the client node to use the associated checksums to perform the validity check includes: sending, by the server, a first indication of contents of the buffer to the client node, wherein the first indication includes an instruction to use the associated checksums to perform the validity check, wherein the server transmits the first indication across a network between a node of the server and the client node.

11. The computer program product of claim 10, the program instructions readable and/or executable by the server to cause the server to: in response to receiving a second indication that results of the performed validity check indicate a validation failure of the data of the data block, perform, by the server, a read and validation of the data of the data block from the data storage drive.

12. The computer program product of claim 11, wherein the second indication is received from the client application.

13. The computer program product of claim 10, the program instructions readable and/or executable by the server to cause the server to: cause, by the server, the client application to process the data of the data block based on results of the performed validity check indicating a validation success of the data of the data block.

14. The computer program product of claim 13, wherein a validity check is not performed by the server.

15. The computer program product of claim 9, wherein the read request is a full block read of the data block.

16. The computer program product of claim 9, the program instructions readable and/or executable by the server to cause the server to: cause, by the server, a filesystem of the data storage drive to block data writes at least until a determination is made that the data of the data block is validated during performance of the validity check.

17. A system, comprising:
a plurality of non-volatile random access memory (NVRAM) blocks configured to store data; and
a processor and logic integrated with and/or executable by the processor, the logic being configured to:
receive, by a server from a client application, a read request for a data block;
read, by the server, data of the data block and checksums associated with the data block, from a data storage drive;
store, by the server, the data of the data block and the associated checksums in a buffer; and
cause, by the server, a client node to use the associated checksums to perform a validity check for the data of the data block and a transmission from the server to the client node.

18. The system of claim 17, wherein causing the client node to use the associated checksums to perform the validity check includes: sending, by the server, a first indication of contents of the buffer to the client node, wherein the first indication includes an instruction to use the associated checksums to perform the validity check, wherein the server transmits the first indication across a network between a node of the server and the client node.

19. The system of claim 18, the logic being configured to: in response to receiving a second indication that results of the performed validity check indicate a validation failure of the data of the data block, perform, by the server, a read and validation of the data of the data block from the data storage drive.

20. The system of claim 19, wherein the second indication is received from the client application.

* * * * *